United States Patent
Kakkar et al.

(10) Patent No.: US 11,151,370 B2
(45) Date of Patent: Oct. 19, 2021

(54) TEXT WRAP DETECTION

(71) Applicant: Adobe Inc., San Jose, CA (US)

(72) Inventors: Gaurav Tarlok Kakkar, Hoshiarpur (IN); Monica Singh, Agra (IN)

(73) Assignee: Adobe Inc., San Jose, CA (US)

( * ) Notice: Subject to any disclaimer, the term of this patent is extended or adjusted under 35 U.S.C. 154(b) by 181 days.

(21) Appl. No.: 16/190,562

(22) Filed: Nov. 14, 2018

(65) Prior Publication Data
US 2020/0151445 A1 May 14, 2020

(51) Int. Cl.
*G06K 9/00* (2006.01)
*G06K 9/62* (2006.01)
(Continued)

(52) U.S. Cl.
CPC ......... *G06K 9/00463* (2013.01); *G06F 16/93* (2019.01); *G06K 9/34* (2013.01); *G06K 9/6228* (2013.01); *G06N 3/04* (2013.01)

(58) Field of Classification Search
CPC ........... G06K 2209/01; G06K 9/00456; G06K 9/00463; G06K 9/6274; G06K 9/00442; G06K 9/00449; G06K 9/00469; G06K 9/00671; G06K 9/2054; G06K 9/325; G06K 9/4628; G06K 9/4642; G06K 9/4647; G06K 9/54; G06K 9/6212; G06K 15/02; G06K 15/1851; G06K 2009/2045; G06K 2009/4666; G06K 2209/013; G06N 3/08; G06N 3/0454; G06N 5/046; G06N 20/00; G06N 3/04; G06N 3/0427; G06N 3/0445; G06N 5/022; G06T 11/60; G06T 2207/20024; G06T 2207/20081;
(Continued)

(56) References Cited

U.S. PATENT DOCUMENTS 8,989,485 B2 * 3/2015 Chulinin ............ G06K 9/00375
382/165
2008/0292130 A1 * 11/2008 Nafarieh ............ G06K 9/00456
382/100
(Continued)

OTHER PUBLICATIONS

Girshick,"Fast R-CNN—Object Detection with Caffe", Retrieved at http://tutorial.caffe.berkeleyvision.org/caffe-cvpr15-detection.pdf, May 2016, 30 pages.
(Continued)

*Primary Examiner* — Golam Sorowar
(74) *Attorney, Agent, or Firm* — FIG. 1 Patents

(57) ABSTRACT

In implementations of text wrap detection, one or more computing devices of a system implement a text wrap module for detecting text wrap around a component of digital content of a document. The document is preprocessed to segregate the digital content into a text group and a non-text group. Members of the text group are overlaid with a graphical element colored to provide a contrast between the graphical element and the component of the digital content. The document is converted to a digital image and a feature map of the digital image is generated. The feature map is further processed using machine learning and a detection indication is output. The detection indication may indicate that text wrap is detected around a member of the text group, a member of the non-text group, or that no text wrap is detected.

20 Claims, 9 Drawing Sheets

(51) Int. Cl.
*G06K 9/34* (2006.01)
*G06F 16/93* (2019.01)
*G06N 3/04* (2006.01)

(58) Field of Classification Search
CPC ......... G06T 2207/20084; G06T 3/4046; G06T 7/11; G06T 2207/20212; G06T 2207/30176; G06T 2207/30241
See application file for complete search history.

(56) References Cited

U.S. PATENT DOCUMENTS

| | | | |
|---|---|---|---|
| 2012/0294524 A1* | 11/2012 | Zyuzin | G06K 9/00456 382/166 |
| 2015/0242684 A1* | 8/2015 | Arad | G06F 16/9554 382/176 |
| 2016/0371312 A1* | 12/2016 | Ben-Aharon | G06F 40/106 |
| 2018/0330156 A1* | 11/2018 | Rakita | G06K 9/00463 |
| 2019/0050639 A1* | 2/2019 | Ast | G06K 9/00463 |
| 2019/0266433 A1* | 8/2019 | Foroughi | G06K 9/00449 |

OTHER PUBLICATIONS

Ren,"Faster R-CNN: Towards Real-Time Object Detection with Region Proposal Networks", arXiv preprint arXiv:1506.01497v2, Sep. 13, 2015, 10 pages.

* cited by examiner

TEXT WRAP DETECTION

BACKGROUND

Text wrap is a common feature in text editing/creation applications that allows text to wrap around almost any object in an electronic document. For example, text can be wrapped around components of digital content of the document including graphics, boarders, photographs, spaces, other text, etc. Typically, text wrap is included in a document which has a particular format, and the particular format includes information about the document's structure and content. For example, the document format can include a header, metadata, saved content, and an end-of-file marker. This information about the document's structure and content includes everything necessary for any application that is compatible with the particular format to identify the presence of the text wrap in the document. If the document is opened in an application that is compatible with the particular format, then the text wrap in the document is identified by referencing the information about the document. In this way, conventional techniques do not necessarily detect the text wrap, rather, these techniques identify the text wrap in a document as a feature of the document similar to a font size, an embedded object, a background color, etc. However, if a document includes text wrap and the document is of a format that is not compatible with an application used to view/edit the document, then the application may fail to identify the text wrap in the document. In this scenario, the text wrap must be detected in order to understand the context of the document.

Detection of text wrap is important in document analysis and layout processing applications in order to understand the context of a document. More specifically, contextual analysis of the document can provide information about the digital content of the document, such as, continued text story, identification of related objects and like groups within the content, and image-text association. However, detecting text wrap is challenging due to the variety of shapes of digital content that the text may be wrapped around, and detecting text wrapped around other text is particularly challenging because it can be difficult to distinguish one text from the other text. Thus, detection of text wrap presents a technological, computer-based problem.

SUMMARY

Systems and techniques are described for text wrap detection. A computing device implements a text wrap module, which includes a preprocessing module and a wrap detection module. The preprocessing module receives a document having digital content as an electronic data input, and then segregates the document into a text group and a non-text group where the text group includes all of the lines of text from the digital content and the non-text group includes all remaining objects that can be wrapped by text. The preprocessing module overlays graphical elements over each member of the text group, and the graphical elements are uniquely colored or have other distinguishable features to provide a contrast against the graphical elements and the digital content. The graphical elements are sized to fully cover the lines of text so that the text is filtered out from the document because the text itself should be independent of whether text wrap is present. The preprocessing module then converts the preprocessed document into a digital image for further processing using machine learning.

The wrap detection module receives the digital image as an electronic data input, and the wrap detection module also generates a feature map from the digital image. The wrap detection module includes a region proposal network that generates region proposals corresponding to members of the text group or the non-text group. These region proposals are predictions of object bounds within the digital image, and the region proposal network may be implemented as a convolutional neural network for machine learning. The wrap detection module also includes a detection network which classifies the region proposals, and the detection network may also be implemented as a convolutional neural network for machine learning. The wrap detection module adjusts a bounding box on classified region proposals, and then the wrap detection module returns the adjusted bounding box on the digital image along with a confidence score for each corresponding class. If this score exceeds a threshold, then the text wrap module accepts the classification. If a classified region proposal has a confidence score above the threshold for more than one class, then the text wrap module accepts the class associated with the highest score.

The detection network outputs a detection indication corresponding to a digital content component wrapped by text. This detection indication can indicate that the component is a member of the text group which is wrapped by another member of the text group. Alternatively, the detection indication could indicate that the component is a member of the non-text group which is wrapped by a member of the text group. The detection indication may also indicate that no text wrap is detected.

In this manner, text wrap can be accurately and efficiently identified around the digital content component in the document. For example, text wrap is detectable even in "untagged" documents where no information is available about the digital content of the document. In this way, text wrap is also detectable in an image that is part of the content of a document. Thus, the described systems and techniques facilitate text wrap detection in many common situations where such detection was not previously possible.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
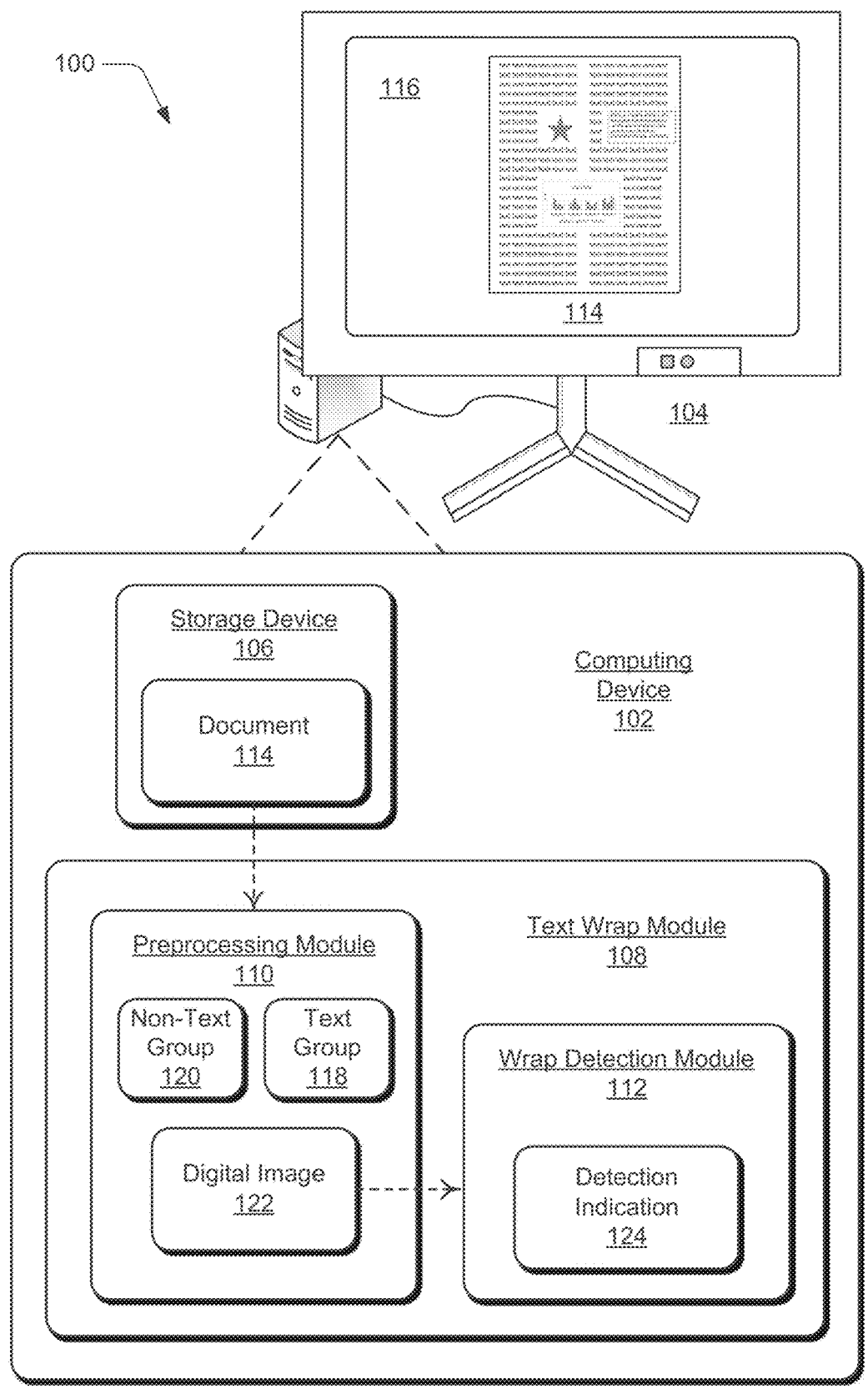
FIG. 1 is an illustration of an environment in an example implementation that is operable to employ digital systems and techniques as described herein.

Text wrap is a common feature in text editing/creation applications that enables text to wrap around almost any object in an electronic document. For example, text can be wrapped around components of digital content of the document including graphics, boarders, photographs, spaces, other text, etc. Typically, text wrap is included in a document which has a particular format, and the particular format includes information about the document's structure and content. For example, the document format can include a header, metadata, saved content, and an end-of-file marker. This information about the document's structure and content includes everything necessary for any application that is compatible with the particular format to identify the presence of the text wrap in the document. If the document is opened in an application that is compatible with the particular format, then the text wrap in the document is identified by referencing the information about the document. In this way, conventional techniques do not necessarily detect the text wrap, rather, these techniques identify the text wrap in a document as a feature of the document similar to a font size, an embedded object, a background color, etc.

However, if a document includes text wrap and the document is of a format that is not compatible with an application used to view/edit the document, then the application may fail to identify the text wrap in the document. In this scenario, the text wrap must be detected in order to understand the context of the document. Although wrapping text around a component of digital content has become commonplace, detecting text wrap around the component remains challenging due to the complexity and variety of components that can be wrapped by text. Detecting text wrapped around other text is particularly challenging because it is difficult to distinguish one text from the other text.

A computing device implements a text wrap module, which includes a preprocessing module and a wrap detection module. The preprocessing module receives a document as an input and then segregates digital content of the document into a text group and a non-text group before converting the document into a digital image. The wrap detection module receives the digital image as an input and then processes the digital image to identify text wrap around a component of the digital content. Generally, a component of the digital content may include graphic objects, boarders, photographs, text, spaces between text, patterns, etc.

To identify the component of the digital content, the text wrap module first determines whether there is format information available about the digital content of the document. Format information is available about the digital content if the document is fully "tagged" or contains metadata describing the layout of the digital content. For example, the format information may include definitions of sections of text in the document, and which lines of text are included within each of the sections. The preprocessing module segregates the digital content of the document into a text group and a non-text group where the text group includes all of the lines of text from the digital content and the non-text group includes all remaining objects that can be wrapped by text.

The preprocessing module overlays graphical elements over each line of text from the text group. The preprocessing module generates graphical elements with dimensions configured to fully cover the lines of text so that the text is filtered out from the document because the text itself is independent of whether text wrap is present. The preprocessing module also colors or otherwise distinguishes the graphical elements to provide a contrast against the graphical elements and the digital content.

If format information is available about the digital content, then the preprocessing module assigns a unique color or another visually distinguishing feature to each section of text and overlays each line of text within each section with a graphical element having the unique color or feature to provide contrast against the sections of text. Otherwise, if format information is not available about the digital content, then the preprocessing module selects a base color having a contrast between the background and the digital content, e.g., the base color can be selected as the text color. The preprocessing module overlays each line of the text of the text group with a graphical element having a unique shade of the selected base color, ensuring that text closer in the text group are colored with nearby shades of the selected base color. Thus, the preprocessing module effectively portrays a color gradient over the text of the text group when format information is not available about the digital content. In this way, text wrap can be detected around text itself since the graphical overlays are distinguishable from each other. The preprocessing module then converts the digital content of the document into a digital image for further processing by the wrap detection module.

The wrap detection module is generally a machine-learning model. As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. According to various implementations, such a machine-learning model uses supervised learning, unsupervised learning, or reinforcement learning. For example, the machine-learning model can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. Thus, a machine-learning model makes high-level abstractions in data by generating data-driven predictions or decisions from the known input data.

In one example, the warp detection module may be implemented as a convolutional neural network. A convolutional neural network includes multiple layers for processing images and generating feature vectors. The accuracy of learning features depends on how well the convolutional neural network is trained. Generally, training is driven by a training dataset and a training task. The training dataset is labeled. The training task is defined by the labels and by a type of cost function. Once a convolutional neural network is trained, the trained network can be used to learn features from an image. In this example, the features are text wrap and the image is the digital image of the content of the document. The wrap detection module generates a feature map from the digital image which is processed by a region proposal network to generate region proposals corresponding to members of the text group or the non-text group. Specifically, the region proposals are generated by anchors of sliding windows which overlap ground-truth bounding boxes of the feature map to identify spatial features. The spatial features are extracted from the feature map and are processed by sub-networks including a regressor which determines a predicted bounding box and a classifier which determines if the predicted bounding box contains an object or background. These region proposals are predictions of object bounds within the digital image, and the region proposal network may be implemented as a convolutional neural network. The wrap detection module also includes a detection network which classifies the region proposals, and the detection network may also be implemented as a convolutional neural network.

The wrap detection module adjusts a bounding box on classified region proposals, and then the wrap detection module returns the adjusted bounding box on the digital image along with a confidence score for each corresponding class. The confidence score represents a likelihood that a class is present. If this confidence score exceeds a threshold, then the text wrap module accepts the classification. Additionally, if a classified region proposal has a confidence score above the threshold for more than one class, then the text wrap module accepts the class associated with the highest score.

The detection network outputs a detection indication. This detection indication can indicate that digital content component is a member of the text group which is wrapped by another member of the text group. Alternatively, the detection indication could indicate that the component is a member of the non-text group which is wrapped by a member of the text group. The detection indication may also indicate that no text wrap is detected. In this manner, text wrap can be accurately and efficiently identified around the digital content component in the document.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques for text wrap detection, as described herein. The illustrated environment 100 includes a computing device 102 and a display device 104 that are communicatively coupled via a wired or a wireless connection. A variety of device configurations may be used to implement the computing device 102 and/or the display device 104. The computing device 102, for instance, may be configured as a desktop computer, a laptop computer, a mobile device, and so forth. Thus, the computing device 102 may range from a full resource device with substantial memory and processor resources (e.g., a personal computer, a game console) to a low-resource device with limited memory and/or processing resources (e.g., a mobile device). Additionally, although a single computing device 102 is shown, the computing device may be representative of multiple, different devices, such as multiple servers utilized by a business to perform operations on-line or "over the cloud."

The computing device 102 includes a storage device 106 and a text wrap module 108, and the text wrap module 108 includes a preprocessing module 110 and a wrap detection module 112. The preprocessing module 110 is implemented to preprocess a document 114 having digital content which is illustrated as being displayed in a user interface 116 on the display device 104. The preprocessing module 110 segregates the document 114 into a text group 118 and a non-text group 120 so that text can be overlaid and filtered out from the document 114. The preprocessing module 110 then converts the text group 118 and the non-text group 120 into a digital image 122 of the document 114.

The wrap detection module 112 is implemented to process the digital image 122 of the document to detect text wrapped around a digital content component which is illustrated as a detection indication 124. The component can be any object that text may be wrapped around, including text that is wrapped by other text. Although illustrated as implemented locally at the computing device 102, functionality of the text wrap module 110 may be also be implemented in whole or in part via functionality available via a network, such as part of a web service of one or more server computing devices "in the cloud."

Document Preprocessing Examples

The following discussion describes document preprocessing techniques that may be implemented utilizing the described systems and devices. Aspects of each of the techniques may be implemented in hardware, firmware, software, or a combination thereof. These document preprocessing examples include procedures which are shown as a set of blocks that specify operations performed by one or more devices and are not necessarily limited to the orders shown for performing the operations by the respective blocks. In portions of the following discussion, reference will be made to FIG. 1.

Figure 2:
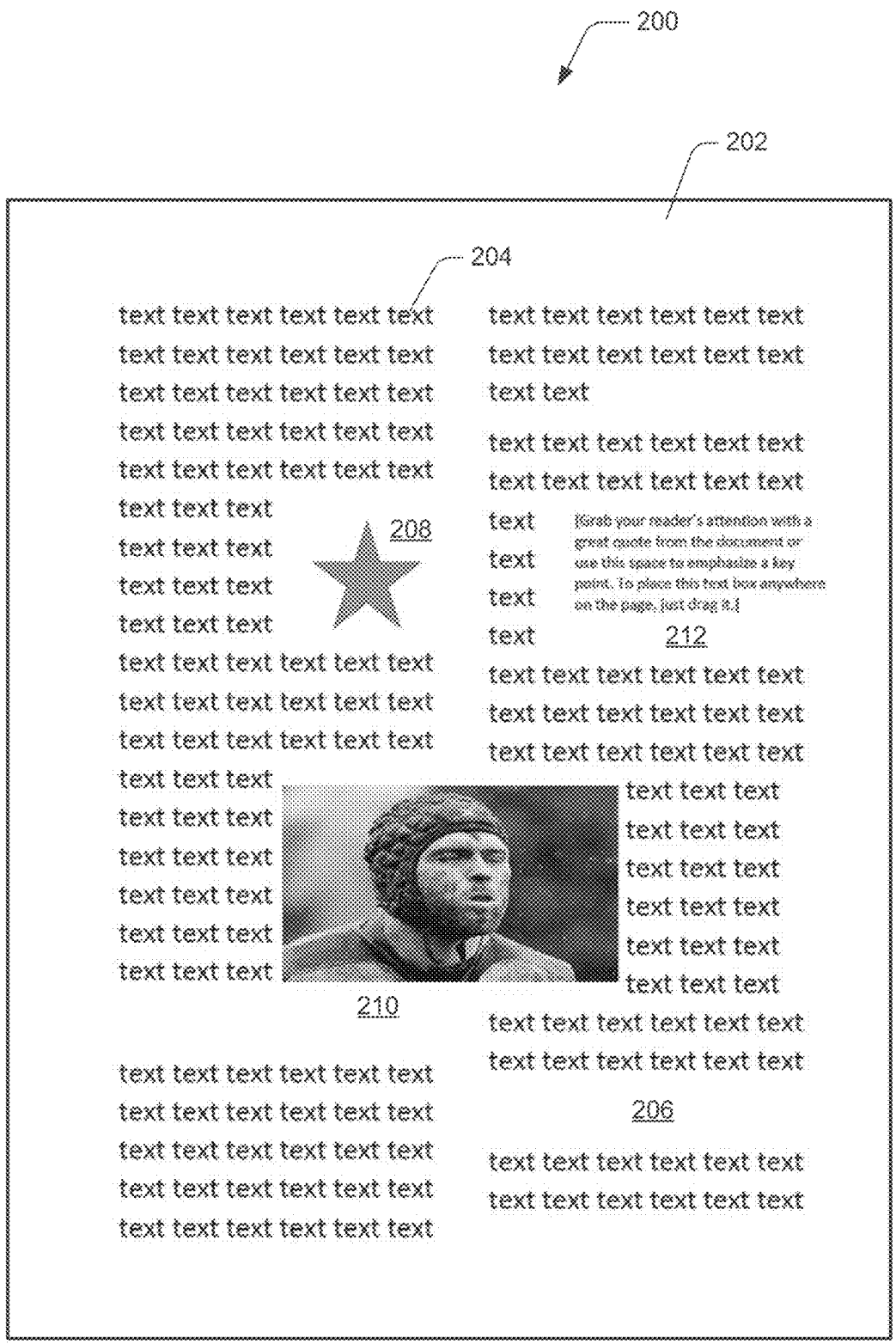
FIG. 2 is an illustration depicting a document having digital content with available information about the digital content.

FIG. 2 is an illustration depicting a document 200 having digital content with available format information about the digital content. The document 200 has a particular format, and the particular format includes information about the document's structure and content. For example, the document format can include a header, metadata, saved content, and an end-of-file marker. The digital content of the document 200 includes a background 202, lines of text 204, spaces between text 206, a graphic object 208, a photograph 210, and other lines of text 212. In this example, text is wrapped around the graphic object 208, the photograph 210, and around the other lines of text 212. This document 200 has available format information about its digital content, meaning that this document is tagged or includes metadata describing the digital content. In this example, the available format information about the digital content includes specific groups or sections of the lines of text 204 as well as the other lines of text 212.

Figure 3:
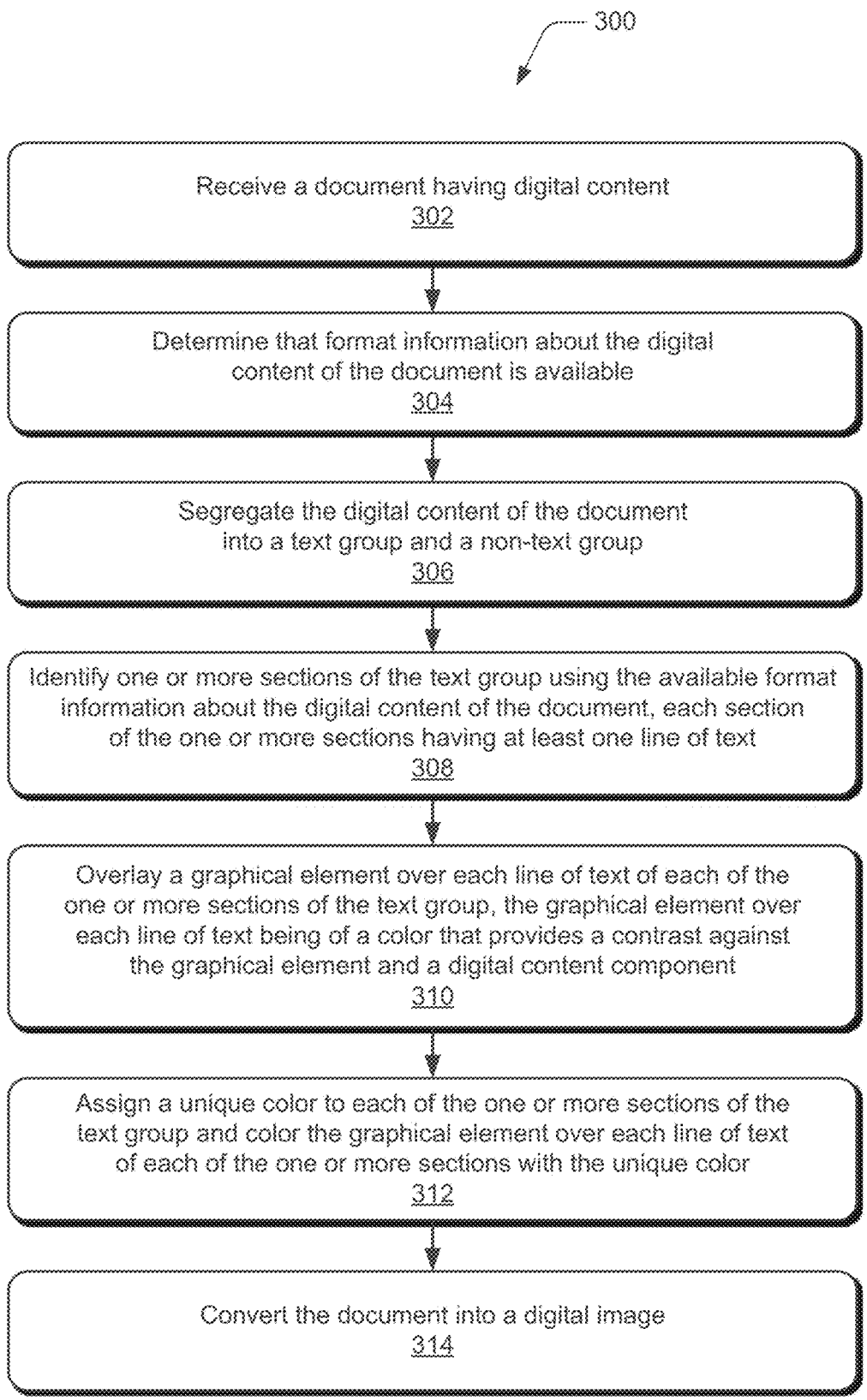
FIG. 3 is a flow diagram depicting a procedure in an example implementation in which a document having digital content with available information about the digital content is preprocessed for text wrap detection.

FIG. 3 is a flow diagram depicting a procedure 300 in an example implementation in which a document having digital content with available format information about the digital content is preprocessed for text wrap detection. A document having digital content is received (at 302). After the document is received, it is determined that format information about the digital content of the document is available (at 304). For example, the text wrap module 108 receives the document 114 and determines that the format information about the document's digital content is available for use in preprocessing the document. The digital content of the document is then segregated into a text group and a non-text group (at 306). For example, the preprocessing module 110 segregates the digital content of the document 114 into the text group 118 and the non-text group 120. The text 118 group includes all lines of text of the document. This means the text group may include both text that may be wrapped around a component of the digital content and text that is wrapped by other text. The non-text group 120 includes all components of the digital content other than the lines of text that may be wrapped by text.

Sections of the text group are identified using the available format information about the digital content (at 308). For example, the text wrap module 108 identifies the sections of the text group by reference to section tags in the available format information, and each of the identified sections includes at least one line of text. A graphical element is overlaid over each line of text of each section of the text group (at 310). For example, the preprocessing module 110 overlays graphical elements over lines of the text of each of the sections in the text group. The graphical element is generated with dimensions configured to cover the entirety of the text of each line of text of the section because the text itself is independent of whether or not text is wrapped. In this manner, the text is filtered out from the document by the graphical elements so that text wrap may be detected.

A unique color or other visually distinguishable feature is assigned to each of the sections, and graphical elements over lines of text in each section are colored the unique color or feature assigned to the section (at 312). Examples of visually distinguishable features can include colors, patterns, hatch marks, etc. For example, the preprocessing module 110 assigns the unique color to each of the sections and then colors the graphical elements over the text of each section so that all of the graphical elements associated with each section are the same color. In other words, each section of text is assigned a unique color and all the graphical elements over the text of each section are the same unique color. So, in this example, if there were two sections within the text group and the first section had two lines of text and the second section had three lines of text, then two graphical elements of a first color or having a first feature would be overlaid over the two lines of text of the first section and three graphical elements of a second color or having a second feature would be overlaid over the three lines of text of the second section.

The color or unique feature provides a contrast against the graphical element and a component of the digital content, and the color also provides contrast against the graphical element and the background 202. The preprocessing module 110 overlays the graphical elements over the sections of text so that each section's graphical elements are a unique color or feature because text may be wrapped around other text and the differences between the colors or features distinguish between the sections of the text group. This allows for text wrap detection when the digital content component that is wrapped by text is also text. The document 200 is converted into a digital image (at 314). For example, the preprocessing module 110 converts the document into the digital image for further processing by a machine-learning model.

Figure 4:
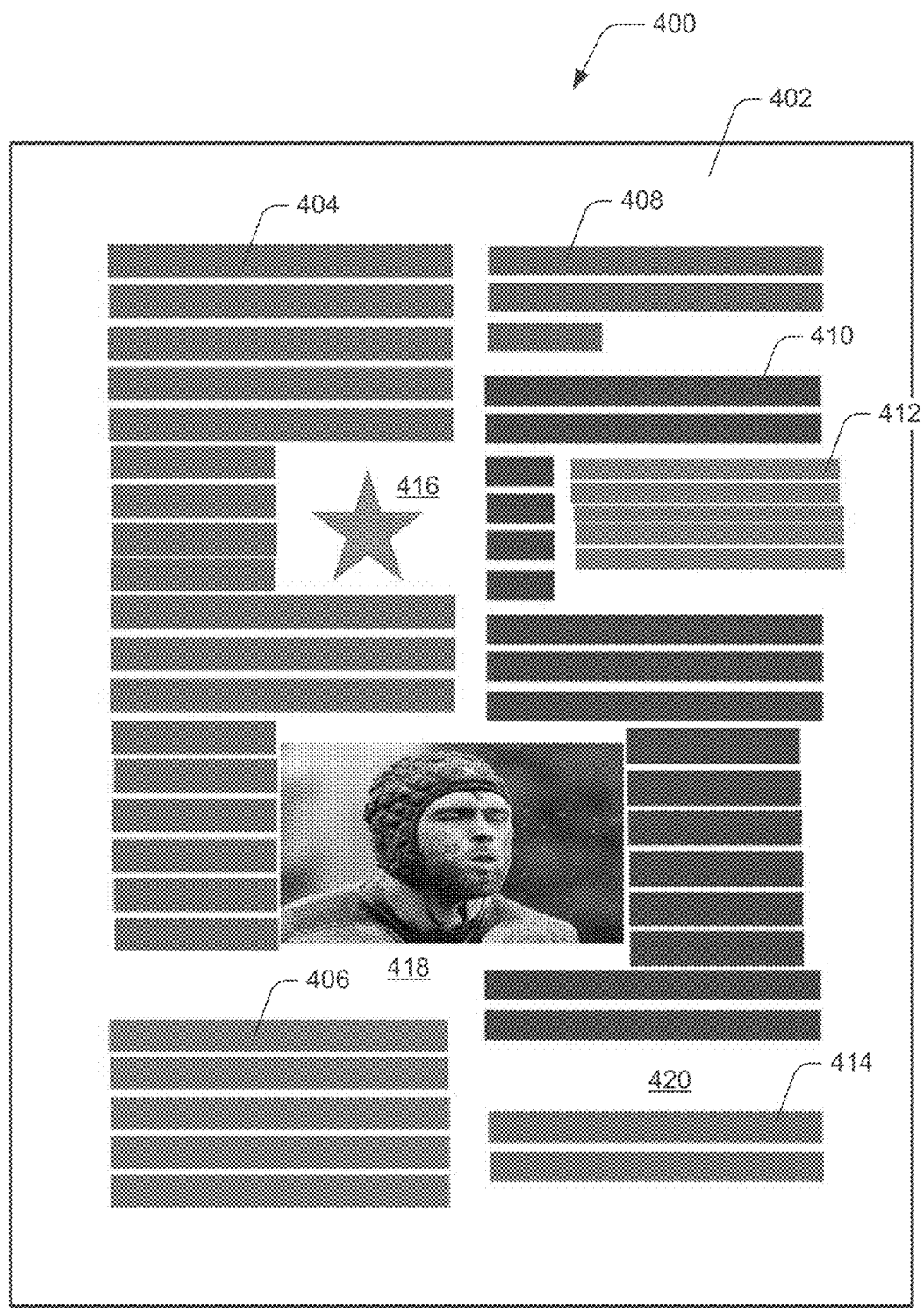
FIG. 4 is an illustration depicting a digital image of a document having digital content with available information about the digital content.

FIG. 4 is an illustration depicting a digital image 400 of the document shown in FIG. 2 after the document 200 is processed by the preprocessing module 110. As shown in FIG. 4, the digital image 400 includes a background 402, graphical elements of several different colors 404-414 (e.g., six different colors in this example). The six different colors indicate that document 200 includes six sections of text. The digital image 400 also includes a graphic object 416, a photograph 418, and spaces between text 420. The other lines of text 212 as shown in document 200 in FIG. 2 are now overlaid by the graphical elements of a color 412. In this manner, the lines of text 204 and the other lines of text 212 have been filtered out from the digital image 400 because they are covered by the graphical elements. Text wrap can now be detected as the graphical elements wrapped around a component of the digital content, for example, using machine learning. This component may include graphic objects, boarders, photographs, text, spaces between text, patterns, etc.

Figure 5:
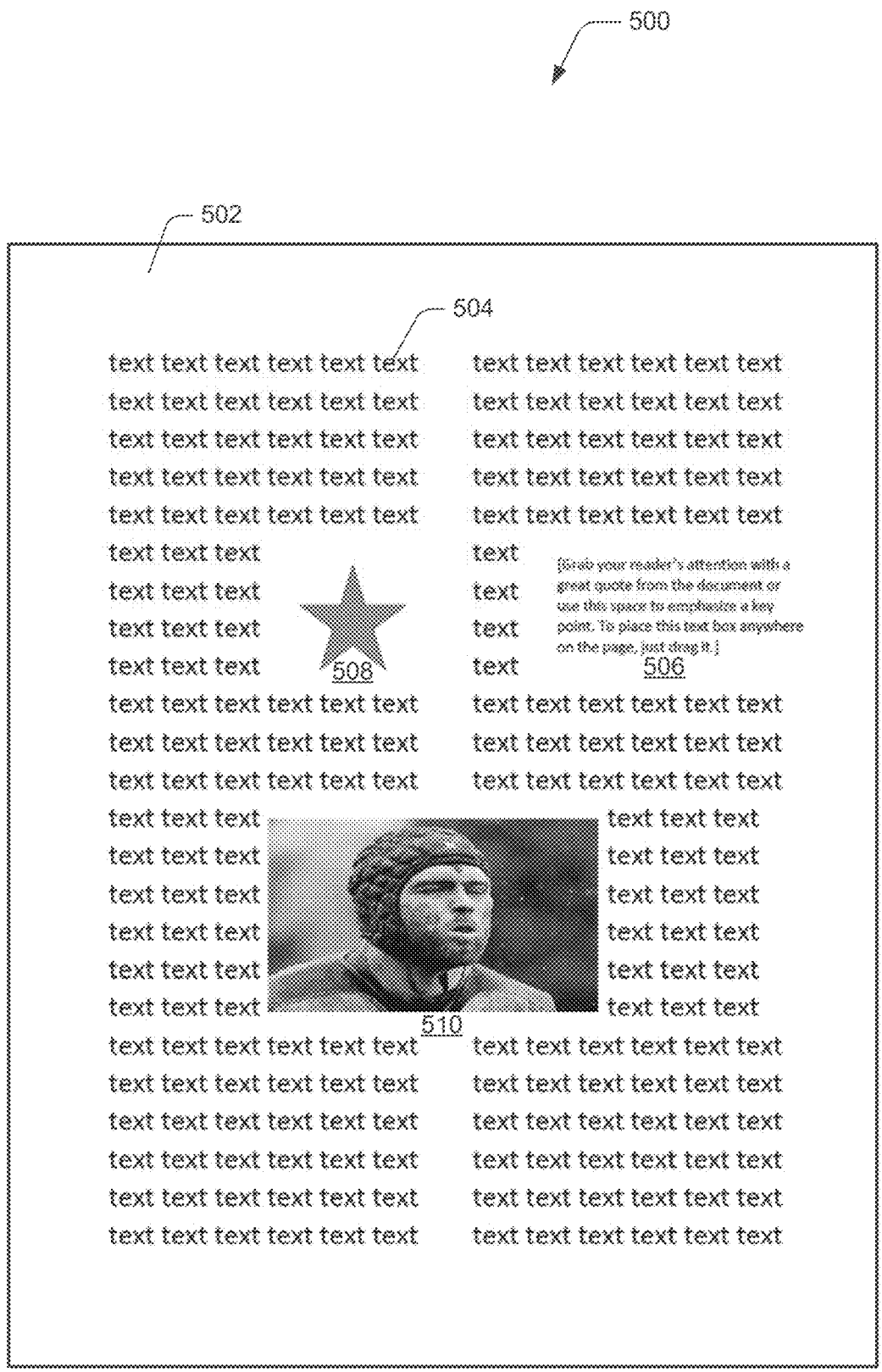
FIG. 5 is an illustration depicting a document having digital content without available information about the digital content.

FIG. 5 is an illustration depicting a document 500 having digital content without available format information about the digital content. The digital content of the document 500 includes a background 502, lines of text 504, other lines of text 506, a graphic object 508, and a photograph 510. In this example, text is wrapped around the graphic object 508, the photograph 510, and around the other lines of text 506. This document 500 does not have available format information about the digital content, meaning that this document is not tagged or does not include metadata describing the digital content. In this example, the only available information about the digital content is that the digital content includes text. Although illustrated separately in FIG. 5, the document 500 would, in this example, not necessarily have information available to distinguish between lines of text 504 and the other lines of text 506.

Figure 6:
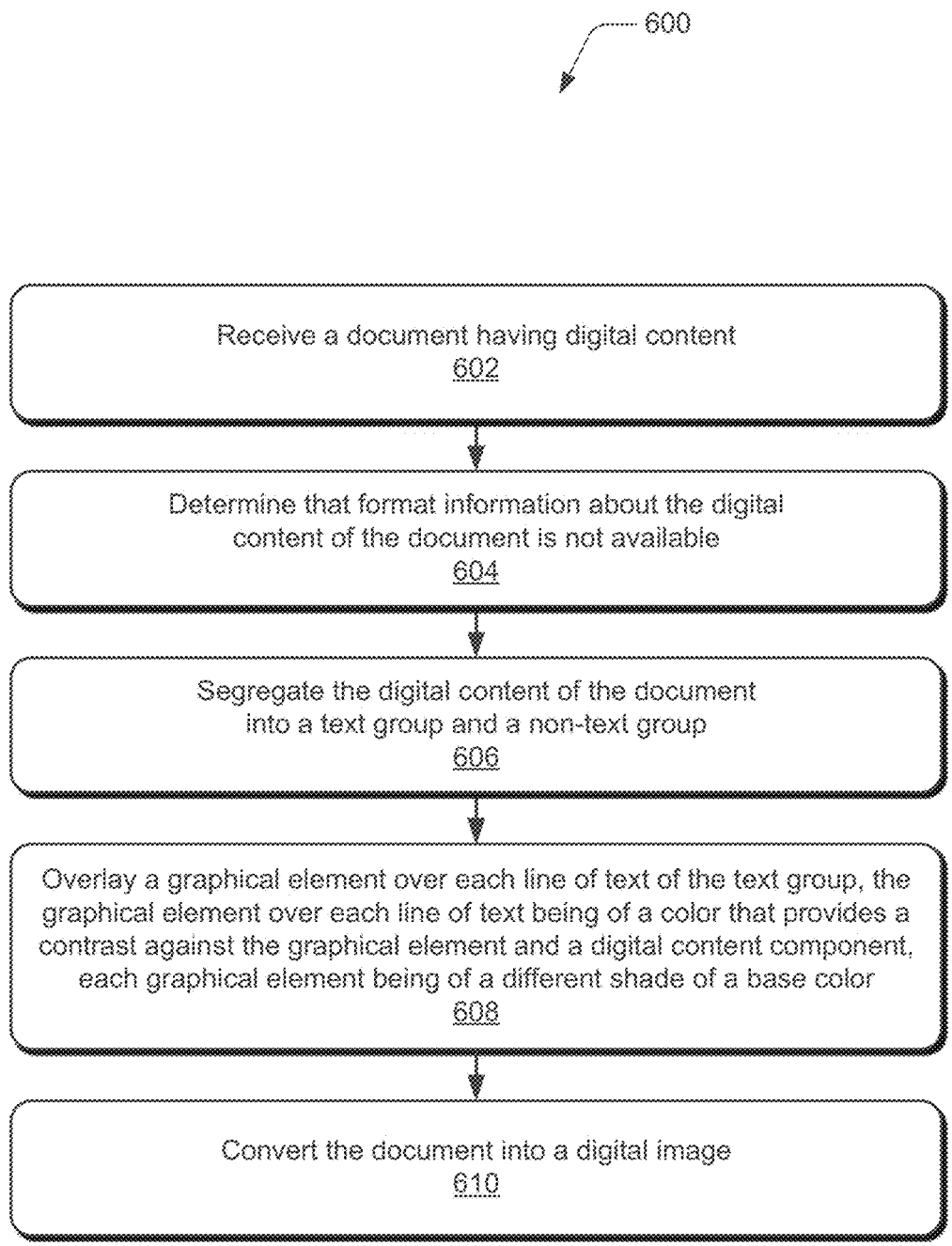
FIG. 6 is a flow diagram depicting a procedure in an example implementation in which a document having digital content without available information about the digital content is preprocessed for text wrap detection.

FIG. 6 is a flow diagram depicting a procedure 600 in an example implementation in which a document having digital content without available information about the digital content is preprocessed for text wrap detection. A document having digital content is received (at 602). It is determined that format information about the digital content of the document is not available (at 604). For example, the text wrap module 108 receives the document 500 and determines that format information about the document's digital content is not available. The digital content of the document is segregated into a text group and a non-text group (at 606). For example, the preprocessing module 110 segregates the digital content of the document into the text group 118 and the non-text group 120. The text group 118 includes all of the lines of text of the digital content of the document 500. This means the text group includes both text that may be wrapped around a component of the digital content and text that is wrapped by other text. The non-text group 120 includes all components of the digital content that may be wrapped by text other than members of the text group.

A graphical element is overlaid over each line of text of the text group, and each graphical element is colored as a different shade of a base color (at 608). For example, the preprocessing module 110 overlays the graphical element over each line of text of the text group 118. Again, the graphical element is generated with dimensions configured to cover the entirety of the text of each line of text to remove text from the document 500. The graphical element over each line of text is colored to provide a contrast against the graphical element and a component of the digital content. In this example, each graphical element is a distinct shade of a base color so that each graphical element is a unique color different from the other graphical elements which also provides a contrast against the graphical elements and the background 502. Although described as a color contrast, the contrast between the graphical elements and the background 502 can be a contrast created by a pattern, a shape, a fill intensity level, an outline, a hatching, etc. Unlike the case where format information about the digital content is available and sections of lines of text can be determined, each line of text from the document 500 could wrap around a digital content component or could be wrapped around by another line of text. Thus, each line of text in the document 500 is treated as if it is its own section as in the previous example. The document is converted into a digital image (at 610). For example, the preprocessing module 110 converts the document 500 into the digital image for further processing. This further processing can include processing by a machine-learning model, and this is the motivation for conversion of the document into the digital image. In other words, digital images are useful for processing by the machine-learning model.

Figure 7:
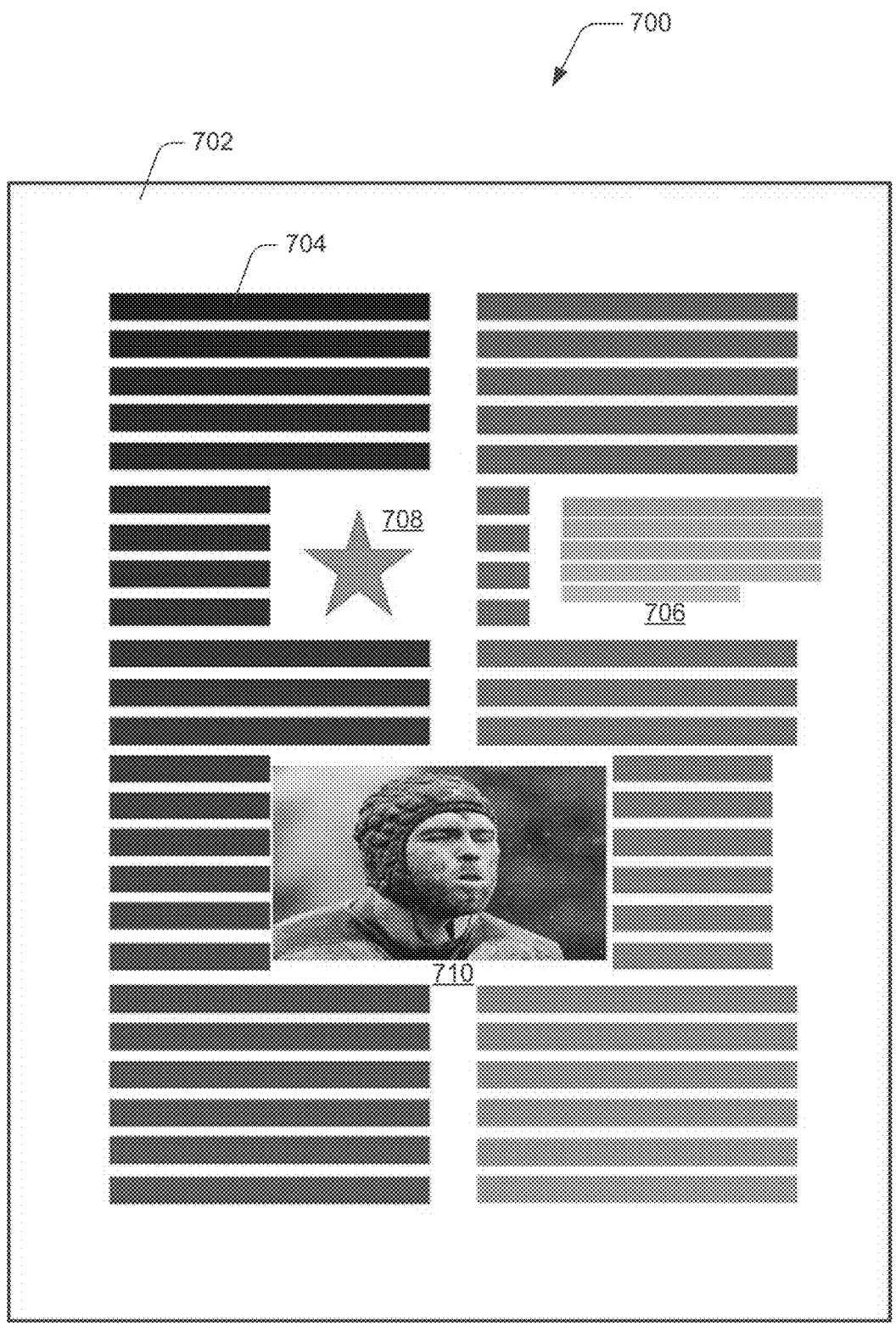
FIG. 7 is an illustration depicting a digital image of a document having digital content without available information about the digital content.

FIG. 7 is an illustration depicting a digital image 700 of the document shown in FIG. 5 after the document 500 is processed by the preprocessing module 110. The digital image 700 includes a background 702 and graphical elements 704. In this example, the preprocessing module 110 has overlaid graphical elements 704 over the other lines of text 706. As shown in FIG. 7, each graphical element 704 is a distinct shade of a base color causing each graphical element have a unique color that is different from the color of every other graphical element. Although described as a distinct shade of a base color, other means of differentiation are contemplated. The digital image 700 also includes a graphic object 708 and a photograph 710. However, the lines of text 504 and the other lines of text 506 have been filtered out from the digital image 700 because the preprocessing module 110 has covered them with the graphical elements. The wrap detection module 112 may now detect text wrap as the graphical elements wrapped around a digital content component, for example, using machine learning. This detection can include graphical elements 704 wrapped around the graphic object 708 and/or the photograph 710. The text wrap detection module 112 can also detect graphical elements 704 wrapped around other graphical elements which indicates that the wrap detection module 112 has detected text that is wrapped by other text.

Text Wrap Detection

Figure 8:
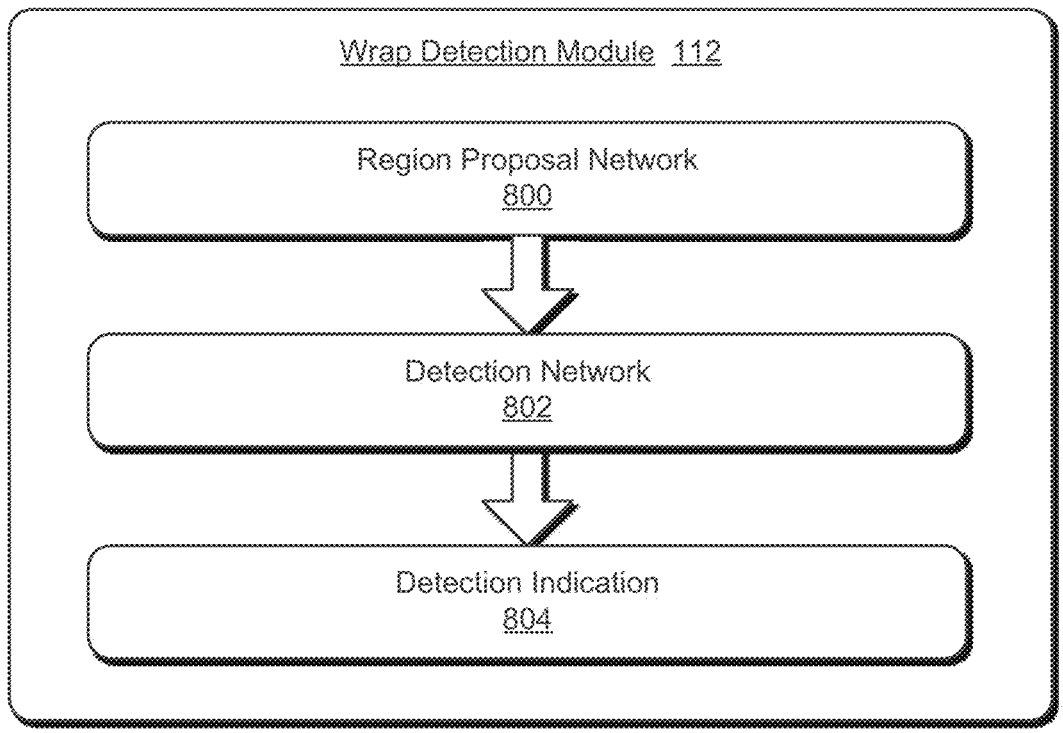
FIG. 8 is an illustration depicting a wrap detection module.

FIG. 8 is an illustration depicting the wrap detection module 112. The wrap detection module 112 is generally a machine-learning model. As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. According to various implementations, such a machine-learning model uses supervised learning, unsupervised learning, or reinforcement learning. For example, the machine-learning model can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. Thus, a machine-learning model makes high-level abstractions in data by generating data-driven predictions or decisions from the known input data.

In one example, the warp detection module 112 may be implemented as a convolutional neural network. A convolutional neural network includes multiple layers for processing images and generating feature vectors. The accuracy of learning features depends on how well the convolutional neural network is trained. Generally, training is driven by a training dataset and a training task. The training dataset is labeled. The training task is defined by the labels and by a type of cost function. Once a convolutional neural network is trained, the trained network can be used to learn features from an image. In this example, the features are text wrap and the image is the digital image 122 of the content of the document.

The wrap detection module 112 is illustrated to include a region proposal network 800, a detection network 802, and a detection indication 804. The wrap detection module 112 may be configured to process a digital image of a document. The digital image may be preprocessed by the preprocessing module 110 as either the digital image 400 of a document having digital content with available format information about the digital content, or the digital image 700 of a document having digital content without available format information about the digital content. The wrap detection module 112 can be implemented to generate a feature map from the preprocessed digital image. However, the text wrap module 108 can also generate the feature map from the preprocessed digital image of the document. By way of example, the feature map may be generated from the preprocessed digital image using known techniques such as the 16-layer model convolutional neural network described by the Visual Geometry Group, Department of Engineering, University of Oxford (VGG-16) pre-trained on ImageNet.

The region proposal network 800 may receive the feature map as an input to generate region proposals. For example, the region proposal network 800 is a convolutional neural network configured to generate region proposals. Specifically, the region proposals are generated by anchors of sliding windows which overlap ground-truth bounding boxes of the feature map to identify spatial features. The spatial features are extracted from the feature map and are processed by sub-networks including a regressor which determines a predicted bounding box and a classifier which determines if the predicted bounding box contains an object or background. These region proposals correspond to members of the text group 118 or the non-text group 120, and the region proposals are predictions of object bounds within the digital image of the document. For example, the region proposal network 800 may be implemented as a region proposal network of a Faster R-Convolutional Neural Network (Faster R-CNN).

The detection network 802 is also illustrated as a convolutional network configured to process region proposals received from the region proposal network 800. This includes classifying region proposals from the region proposal network 800 into one of two pre-defined foreground classes or a background class. The two pre-defined foreground classes are text wrap around a member of the text group and text wrap around a member of the non-text group. After the classification, the detection network 802 adjusts bounding boxes of the region proposals and returns the bounding boxes on the digital image with confidence scores for corresponding classes. The confidence scores are an indication that a class is present. The confidence scores are compared to a threshold and if the confidence score for a classification is greater than the threshold, then the text wrap module 108 accepts the classification. In an example, the threshold may be defined as 0.5; however, other threshold values are contemplated. If more than one classification has a confidence score that is greater than the threshold, then the classification with the highest confidence score is accepted.

In this manner, the detection network 802 is implemented to detect text wrap around a digital content component using machine learning to produce the detection indication 804. Generally, the digital content component may include graphic objects, boarders, photographs, text, spaces between text, patterns, etc. The detection indication 804 can be that text is wrapped around a member of the non-text group, text is wrapped around a member of the text group, or text is not wrapped around a member of the text group or the non-text group.

In a non-limiting example, the detection network 802 may be trained by stochastic gradient decent, for example, with momentum of 0.9, learning rate set to 0.001, and number of iterations of 10,000. Other methods of training and other training parameters are contemplated. The detection network 802 may be trained using a synthetic dataset and a manually tagged dataset of documents with and without text wrap. Other training datasets are contemplated. These training datasets are training inputs for the detection network 802 which is described by an example convolutional neural network. The training dataset is labeled, and the training task is defined by these labels and by a type of cost function (for example a loss function). In an embodiment, the detection network 802 may be trained by splitting training samples having text wrap into two classes, e.g., one class of training samples having text wrapped around members of the text group 118 and another class of training samples having text wrapped around members of the non-text group 120. In this way, the detection network 802 may be trained advantageously to identify each of the two text-wrap classes and such training may also improve the performance of the detection network 802. Additionally, the performance of the detection network 802 may be further improved by use of both the synthetic dataset and the manually tagged dataset with each dataset including the class of training samples having text wrapped around members of the text group 118 and the class of training samples having text wrapped around members of the non-text group 120.

The example convolutional neural network includes multiple layers, one of the multiple layers including a convolution layer, and the convolution layer including one or more filters. The convolutional neural network is trained based on the set of training inputs and a loss function. By training the detection network with both manually tagged datasets and a synthetic dataset as well as the two classes of text-wrap, the loss function can be minimized and the accuracy of the detection network can be improved. In this way, the detection network 802 can even detect text wrap within a component of the digital content. For example, the digital content component could be an image having text wrap in the image and the detection network 802 can be trained to detect the text wrap in the image. Thus, the described systems and techniques are not limited to detecting text wrap around a component of digital content of a document, and these systems and techniques may be implemented to detect text wrap within the component of the digital content.

Figure 9:
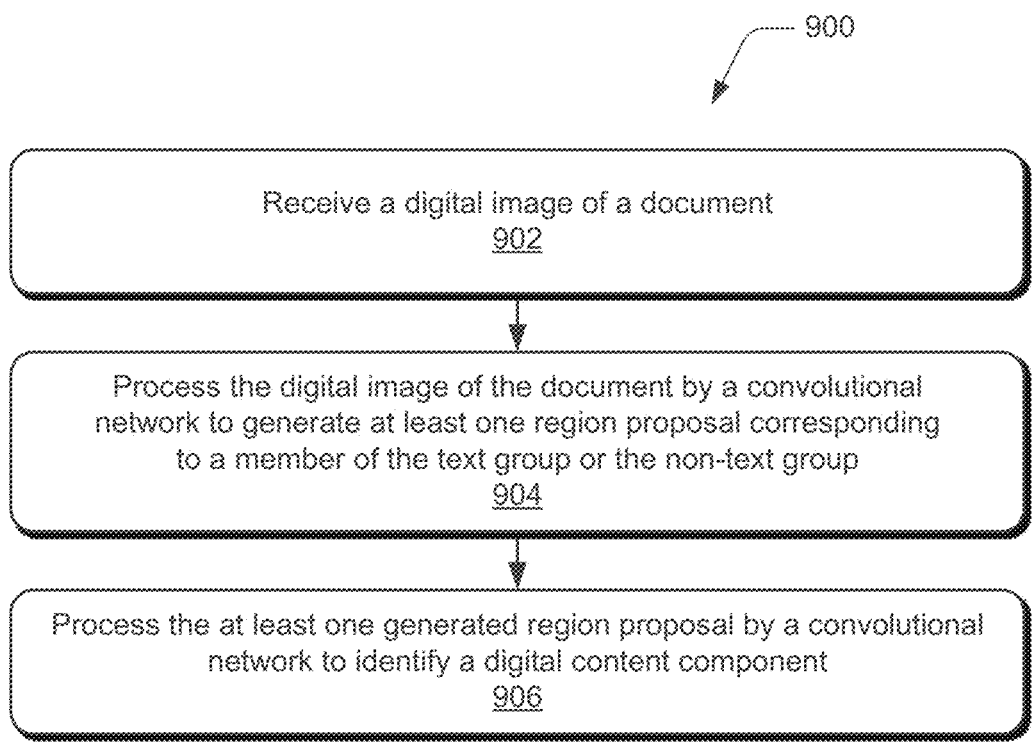
FIG. 9 is a flow diagram depicting a procedure in an example implementation in which a digital image of a document is processed to detect text wrap.

FIG. 9 is a flow diagram depicting a procedure 900 in an example implementation in which a digital image of a document is processed to detect text wrap. A digital image of a document is received (at 902). For example, the wrap detection module 112 may be implemented to receive the digital image of the document. The digital image is processed by a convolutional neural network to generate at least one region proposal corresponding to a member of the text group or the non-text group of the document (at 904). In an example, the region proposal network 800 may be implemented to generate the at least one region proposal. The at least one generated region proposal is processed by another convolutional neural network to identify the component of the digital content (at 906). Although described as two convolutional neural networks, a single convolutional neural network may also be used to achieve the functionality described herein. In this way, the detection network 802 may be implemented to identify the component as the detection indication 804.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example System and Device

Figure 10:
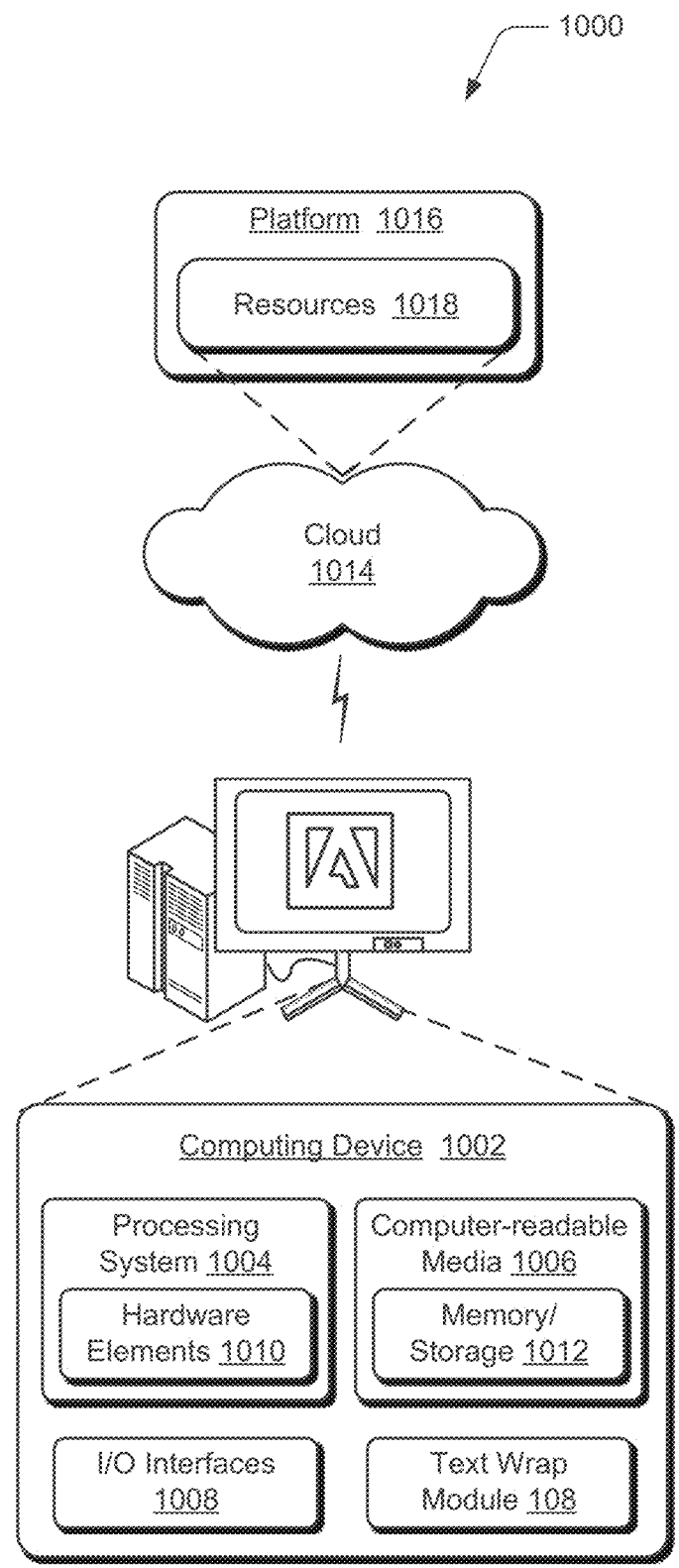
FIG. 10 illustrates an example system with an example computing device that is representative of one or more computing systems and/or devices that may implement the various techniques described herein.

FIG. 10 illustrates an example system generally at 1000 that includes an example computing device 1002 that is representative of one or more computing systems and/or devices that may implement the various techniques described herein. This is illustrated through inclusion of the text wrap module 108. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware.

Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources 1018 and functions to connect the computing device 1002 with other computing devices. The platform 1016 may also serve to abstract scaling of resources 1018 to provide a corresponding level of scale to encountered demand for the resources that are implemented via the platform 1016. Accordingly, in an interconnected device embodiment, implementation of functionality described herein may be distributed throughout the system 1000. For example, the functionality may be implemented in part on the computing device 1002 as well as via the platform that abstracts the functionality of the cloud 1014.

Conclusion

Although the implementation of text wrap detection has been described in language specific to structural features and/or methods, it is to be understood that the appended claims are not necessarily limited to the specific features or methods described. Rather, the specific features and methods are disclosed as example implementations of text wrap detection, and other equivalent features and methods are intended to be within the scope of the appended claims. Further, various different examples are described and it is to be appreciated that each described example can be implemented independently or in connection with one or more other described examples.

What is claimed is:

1. In a digital environment to detect a text wrap as text wrapped around other text of a document, a method implemented by at least one computing device of the digital environment, the method comprising:
   determining an availability of metadata describing digital content of the document;
   segregating the digital content of the document into a text group and a non-text group, the text group including at least one line of text;
   filtering the at least one line of text out from the document by overlaying a graphical element over the at least one line of text of the text group, the graphical element providing a contrast against a background of the document, the contrast selected based on the availability of the metadata;
   converting the document and the graphical element into a digital image; and
   detecting the text wrap as the graphical element wrapped around the other text of the document by processing the digital image of the document using a machine learning model trained to detect text wrap within digital images of documents using a first class of training samples having text wrapped around members of text groups and a second class of training samples having text wrapped around members of non-text groups.

2. The method as in claim 1, wherein the contrast is a color contrast.

3. The method as in claim 1, wherein the graphical element is also wrapped around a photograph included in the non-text group.

4. The method as in claim 1, wherein the graphical element is also wrapped around a graphic object included in the non-text group.

5. The method as in claim 1, wherein the processing the digital image of the document using the machine learning model comprises processing the digital image by a convolutional neural network to generate at least one region proposal corresponding to a member of the text group or the non-text group.

6. The method as in claim 5, wherein the processing the digital image of the document using the machine learning model comprises processing the at least one generated region proposal by the convolutional neural network to identify the other text of the document as a detection indication.

7. The method as in claim 1, wherein the metadata is available and the contrast is selected as a unique color.

8. The method as in claim 1, wherein the metadata is not available and the contrast is selected as a unique shade of a base color.

9. The method as in claim 8, wherein the base color is a text color of the at least one line of text.

10. In a digital environment to detect a text wrap as text wrapped around other text of a document, modules implemented at least partially in hardware of one or more computing devices of a system comprising:
    a preprocessing module implemented to:
        determine an availability of metadata describing digital content of the document;
        segregate the digital content of the document into a text group and a non-text group, the text group including at least one line of text;
        filter the at least one line of text out from the document by overlaying a graphical element over the at least one line of text of the text group, the graphical element providing a contrast against a background of the document, the contrast selected based on the availability of the metadata; and
        convert the document and the graphical element into a digital image; and
    a wrap detection module implemented to detect the text wrap as the graphical element wrapped around the other text of the document by processing the digital image of the document using a machine learning model trained to detect text wrap within digital images of documents using a first class of training samples having text wrapped around members of text groups and a second class of training samples having text wrapped around members of non-text groups.

11. The system of claim 10, wherein the contrast is a color contrast.

12. The system of claim 10, wherein the graphical element is also wrapped around a photograph included in the non-text group.

13. The system of claim 10, wherein the graphical element is also wrapped around a graphic object included in the non-text group.

14. The system of claim 10, wherein the wrap detection module is implemented to process the digital image of the document by a convolutional neural network to generate at least one region proposal corresponding to a member of the text group or the non-text group.

15. The system of claim 14, wherein the wrap detection module is implemented to process the at least one generated region proposal by the convolutional neural network to identify the other text of the document as a detection indication.

16. One or more computer-readable storage media comprising instructions stored thereon that, responsive to execution by a computing device in a digital environment to detect a text wrap as text wrapped around other text of a document, cause operations of the computing device including to:
- determine an availability of metadata describing digital content of the document;
- segregate the digital content of the document into a text group and a non-text group, the text group including at least one line of text;
- filter the at least one line of text out from the document by overlaying a graphical element over the at least one line of text of the text group, the graphical element providing a contrast against a background of the document, the contrast selected based on the availability of the metadata;
- convert the document and the graphical element into a digital image; and
- detect the text wrap as the graphical element wrapped around the other text of the document by processing the digital image of the document using a machine learning model trained to detect text wrap within digital images of documents using a first class of training samples having text wrapped around members of text groups and a second class of training samples having text wrapped around members of non-text groups.

17. The one or more computer-readable storage media of claim 16, wherein the contrast is a color contrast.

18. The one or more computer-readable storage media of claim 16, wherein the graphical element is also wrapped around a photograph included in the non-text group.

19. The one or more computer-readable storage media of claim 16, wherein the graphical element is also wrapped around a graphic object included in the non-text group.

20. The one or more computer-readable storage media of claim 16 wherein the operations of the computing device include to:
- process the digital image of the document by a convolutional neural network to generate at least one region proposal corresponding to a member of the text group or the non-text group; and
- process the at least one generated region proposal by the convolutional neural network to identify the other text of the document as a detection indication.

* * * * *